(12) United States Patent
Liu et al.

(10) Patent No.: US 10,953,476 B2
(45) Date of Patent: Mar. 23, 2021

(54) CHUCK DEVICE

(71) Applicant: SANOH INDUSTRIAL CO., LTD., Tokyo (JP)

(72) Inventors: Jining Liu, Koga (JP); Kazuhiko Nakazato, Koga (JP)

(73) Assignee: SANOH INDUSTRIAL CO., LTD., Tokyo (JP)

(*) Notice: Subject to any disclaimer, the term of this patent is extended or adjusted under 35 U.S.C. 154(b) by 0 days.

(21) Appl. No.: 16/609,770

(22) PCT Filed: Apr. 4, 2018

(86) PCT No.: PCT/JP2018/014493
§ 371 (c)(1),
(2) Date: Oct. 31, 2019

(87) PCT Pub. No.: WO2019/012758
PCT Pub. Date: Jan. 17, 2019

(65) Prior Publication Data
US 2020/0061719 A1    Feb. 27, 2020

(30) Foreign Application Priority Data

Jul. 11, 2017  (JP) .............................. JP2017-135680

(51) Int. Cl.
*B23B 31/30*  (2006.01)
*B23B 31/117*  (2006.01)
*B23B 31/08*  (2006.01)

(52) U.S. Cl.
CPC ........ *B23B 31/1176* (2013.01); *B23B 31/305* (2013.01); *B23B 31/08* (2013.01);
(Continued)

(58) Field of Classification Search
CPC . B23B 31/1176; B23B 31/08; B23B 2226/33; B23B 2231/38; B23B 2231/24;
(Continued)

(56) References Cited

U.S. PATENT DOCUMENTS

| 3,364,533 A | * | 1/1968 | Sibrava | ................. B23B 31/305 |
| | | | | 24/463 |
| 3,663,027 A | * | 5/1972 | Klipping | ................. B23Q 3/12 |
| | | | | 279/4.03 |
| 5,855,446 A | * | 1/1999 | Disborg | ................ B23B 31/305 |
| | | | | 279/4.03 |

FOREIGN PATENT DOCUMENTS

JP            02239093 A  *  9/1990

* cited by examiner

*Primary Examiner* — Eric A. Gates
*Assistant Examiner* — Paul M Janeski
(74) *Attorney, Agent, or Firm* — Posz Law Group, PLC (57) ABSTRACT

A chuck device that allows easy attachment of a clamping target component and can provide powerful and highly reliable clamping includes a main body including a metal core part and an annular space coaxial with and formed around the metal core part; a rubber elastic body fitted in the annular space of the main body such that there is a pressure chamber between a circumferential wall that defines the annular space and the rubber elastic body, and a clearance for allowing a tubular clamping target component to be inserted between the rubber elastic body and the metal core part; and a passage for introducing a fluid to the pressure chamber, wherein the rubber elastic body is deformed to expand toward the metal core part by a pressure of a fluid introduced to the pressure chamber via the passage so that a tubular clamping target component that is attached to the metal core part is clamped by the metal core part and the rubber elastic body that has deformed to expand.

4 Claims, 6 Drawing Sheets

(52) U.S. Cl.
CPC ....... *B23B 2226/33* (2013.01); *B23B 2231/24* (2013.01); *B23B 2231/38* (2013.01)

(58) Field of Classification Search
CPC ..... B23B 31/304; B23B 31/305; B21D 41/04; B23Q 3/06; B25J 15/08; B29C 57/08; B29C 57/00; B29C 57/02; B29C 2043/3233; F16B 2/06
See application file for complete search history.

CHUCK DEVICE

CROSS REFERENCE TO RELATED APPLICATIONS

This application is a U.S. national stage of International Patent Application No. PCT/JP2018/014493 filed on Apr. 4, 2018 and is based on Japanese Patent Application No. 2017-135680 filed on Jul. 11, 2017, the disclosures of which are incorporated herein by reference.

TECHNICAL FIELD

The present invention relates to a chuck device, and more particularly to a chuck device that uses fluid pressure to cause deformation in an elastic member to clamp a clamping target component.

BACKGROUND ART

Chuck devices that use fluid pressure as disclosed in PTL 1 to 3 for example have been known before as a device for clamping a clamping target component such as a workpiece, tool, and the like. These chuck devices basically include a main body and an elastic member fitted in the main body such that a pressure chamber is formed between the main body and the elastic member. When chucking a clamping target component, at least part of this elastic member is expanded by the pressure of a fluid introduced into the pressure chamber in a direction away from the main body, i.e., toward the clamping target component to make pressure contact with the clamping target component, so that the component is clamped between expanded parts of the elastic member.

CITATION LIST

Patent Literature

[PTL 1] Japanese Examined Patent Publication No. S63-50123
[PTL 2] Japanese Utility Model Application Laid-open No. H06-36709
[PTL 3] Japanese Patent No. 5753261

SUMMARY OF INVENTION

Technical Problem

The conventional chuck device that utilizes fluid pressure as described above uses a thin tubular member made of metal, for example, as the elastic member, and fluid pressure is applied from around the thin tubular member to cause the thin tubular member to radially contract within the elastic deformation limit. The amount of radial contraction is therefore relatively small, because of which it is difficult to make a large clearance between the thin tubular member and a clamping target component that is inserted into this thin tubular member. The small clearance in turn made it hard to insert the clamping target component into the thin tubular member quickly and reliably. This required precise positioning and transfer of the clamping target component relative to the thin tubular member particularly when the clamping target component is to be inserted into the thin tubular member with a robot hand or the like in an automated system, and the robot hand or the like for moving the clamping target component with high precision requirements posed the problem of increased facility cost.

The conventional chuck device that uses fluid pressure described above simply causes an elastic member to radially contract by fluid pressure so as to clamp the clamping target component with the contracted elastic member from around. The clamping force is not necessarily strong and there was a problem that the clamping target component would readily come off by a relatively small force when the force was applied to a direction in which the component was pulled out.

The present invention was made in view of the problems encountered by the background art described above. An object of the present invention is to provide a chuck device that allows easy attachment of a clamping target component and can provide powerful and highly reliable clamping.

Solution to Problem

To achieve the object noted above, the present invention provides a chuck device as set forth in the following (1) to (5).

(1) A chuck device including: a main body including a metal core part and an annular space coaxial with and formed around the metal core part; a rubber elastic body fitted in the annular space of the main body such that there is a pressure chamber between a circumferential wall that defines the annular space and the rubber elastic body, and that there is a clearance for allowing a tubular clamping target component to be inserted between the rubber elastic body and the metal core part; and a passage for introducing a fluid to the pressure chamber, wherein the rubber elastic body is deformed to expand toward the metal core part by a pressure of a fluid introduced to the pressure chamber via the passage so that a tubular clamping target component that is attached to the metal core part is clamped by the metal core part and the rubber elastic body that has deformed to expand.

(2) The chuck device set forth in (1) above, wherein the metal core part tapers so as to become gradually narrower from a proximal side toward a distal side.

(3) The chuck device set forth in (1) above, wherein the metal core part is formed in a tubular shape and a high-temperature fluid is introduced into the tubular clamping target component that is attached to the metal core part via the tubular metal core part.

(4) The chuck device set forth in (1) above, wherein the main body is formed with a coolant passage so that the main body is cooled by supplying a coolant into the coolant passage.

(5) The chuck device set forth in (1) above, wherein the rubber elastic body is made of at least one of silicone rubber, ethylene rubber, butyl rubber, and chloroprene rubber.

Advantageous Effects of Invention

The chuck device according to the present invention described above uses a rubber elastic body as an elastic member. Therefore, the large amount of deformation of the rubber allows a sufficient clearance to be provided between the rubber elastic body and the metal core part for the tubular clamping target component to be inserted therein. Moreover, the metal core part also serves as a support for the insertion of the clamping target component when it is attached, so that attachment of the tubular clamping target component does not require high precision and can be automated easily. The device is configured to hold a tubular clamping target component that is attached to the metal core part by clamping the component with the metal core part and the rubber elastic body that has deformed to expand. Therefore the device can achieve powerful and highly reliable clamping.

DESCRIPTION OF EMBODIMENTS

Hereinafter, an embodiment of the chuck device according to the present invention will be described in detail with reference to the drawings.

The drawings illustrate one embodiment of the chuck device according to the present invention, wherein the illustrated chuck device 1 includes a main body 10, and a rubber elastic body 50 accommodated inside the main body 10, to be deformed by fluid pressure to clamp a tubular clamping target component P.

The main body 10 is made up of a body part 11, and two lid parts 12 and 13. These components of the main body 10 should preferably be made of a material that has rigidity and good heat conductivity, for example a metal having heat-resistant and pressure-resistant characteristics such as aluminum, copper, SUS, brass, etc.

The body part 11 is substantially columnar, with a metal core part 14 formed along the axis, and an annular space 15 open on one side and formed around and coaxial with the metal core part 14. A groove 16 is formed in a circumferential wall that defines this annular space 15 to be a pressure chamber extending all around. A joint 18 is connected for introducing a pressurized fluid into a passage 17 that communicates with the groove 16.

The metal core part 14 is tapered so that it reduces in diameter gradually from the proximal end toward the distal end. The taper angle should preferably be 0.5° to 3.0°, and more preferably 0.7° to 1.5°. The metal core part 14 is formed in a tubular shape so that it allows a fluid to pass through therein. A joint 20 is connected for introducing a high-temperature fluid into a passage 19 that communicates with this tubular metal core part 14.

The body part 11 is formed with an annular coolant passage 21 that opens to one end opposite from the end where the annular space 15 mentioned above opens. A joint 23 is connected for supplying a coolant via a passage 22 that communicates with this annular coolant passage 21. On both end faces of the body part 11 are drilled internally threaded holes 24 suitably spaced apart on the same circumference.

The lid parts 12 and 13 are both formed in a disc-like shape having an outside diameter that is substantially the same as the outside diameter of the body part 11. On their plate surfaces are screw passage holes 25 and 26 at positions corresponding to the internally threaded holes 24 formed on both end faces of the body part 11. A component insertion hole 27 is drilled through the center of one lid part 12, which the metal core part 14 of the body part 11 passes through, with an inside diameter that ensures there is a clearance for allowing a tubular clamping target component P to be attached to the metal core part 14. On one side of the hole is an annular groove 29, for an O-ring 28 to be fitted in. The other lid part 13 is formed with a through hole 30 for the joint 20 for introducing a high-temperature fluid to the metal core part 14 to extend out.

The rubber elastic body 50 is fitted in the annular space 15 formed to the body part 11. The lid part 12 is attached with screws 31 to close the opening of the annular space 15. The lid part 13 is attached with screws 32 to close the opening of the coolant passage 21.

The rubber elastic body 50 is in a thick cylindrical shape and should preferably be formed of silicone rubber, ethylene rubber, butyl rubber, or chloroprene rubber, from the viewpoints of elasticity, and shock-resistant and heat-resistant characteristics. The rubber elastic body 50 need not necessarily be made of a single material and may have a double-layer structure using different materials for inner layer and outer layer.

The rubber elastic body 50 is fitted in the annular space 15 of the main body 10 such that there is the pressure chamber (groove 16) between the rubber and the circumferential wall that defines the annular space 15, and that there is a clearance for allowing a tubular clamping target component P to be inserted between the rubber and the metal core part 14.

The chuck device 1 according to the present invention configured as described above is operated as follows to clamp a tubular clamping target component P.

Figure 1:
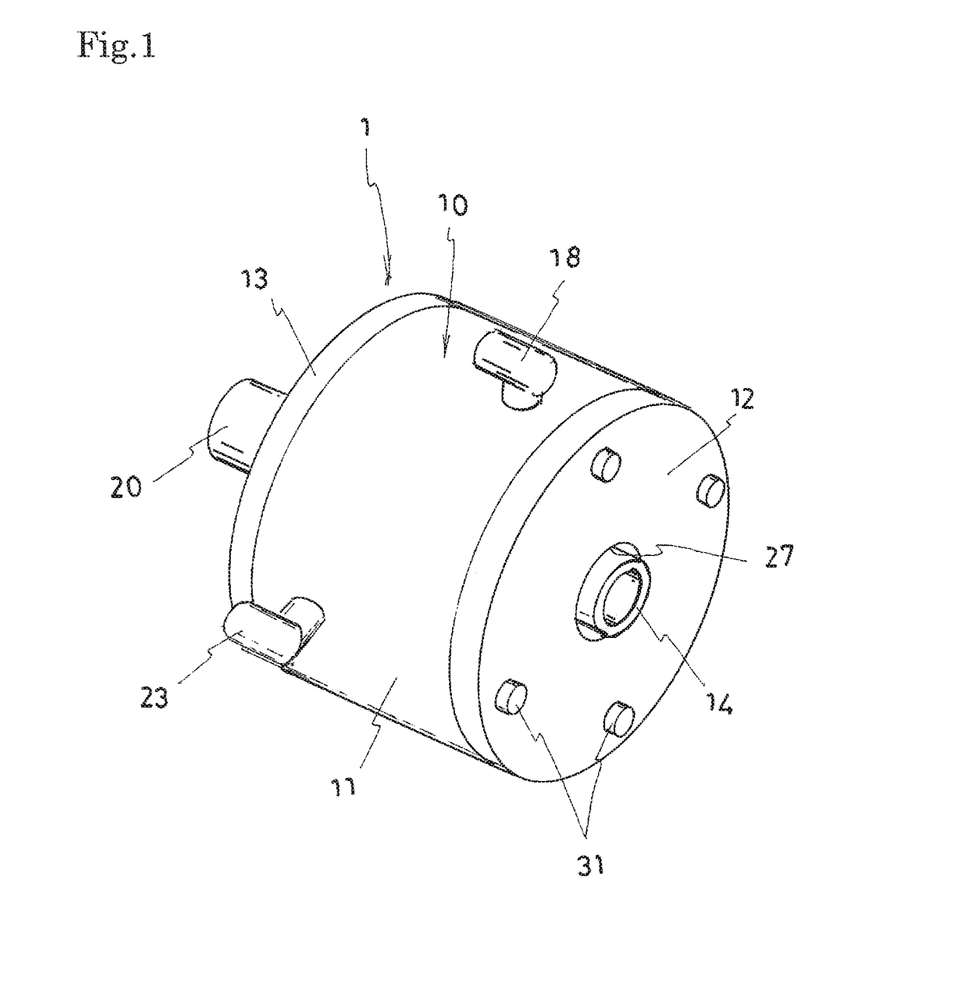
FIG. 1 is a perspective view illustrating one embodiment of the chuck device according to the present invention.
Figure 2:
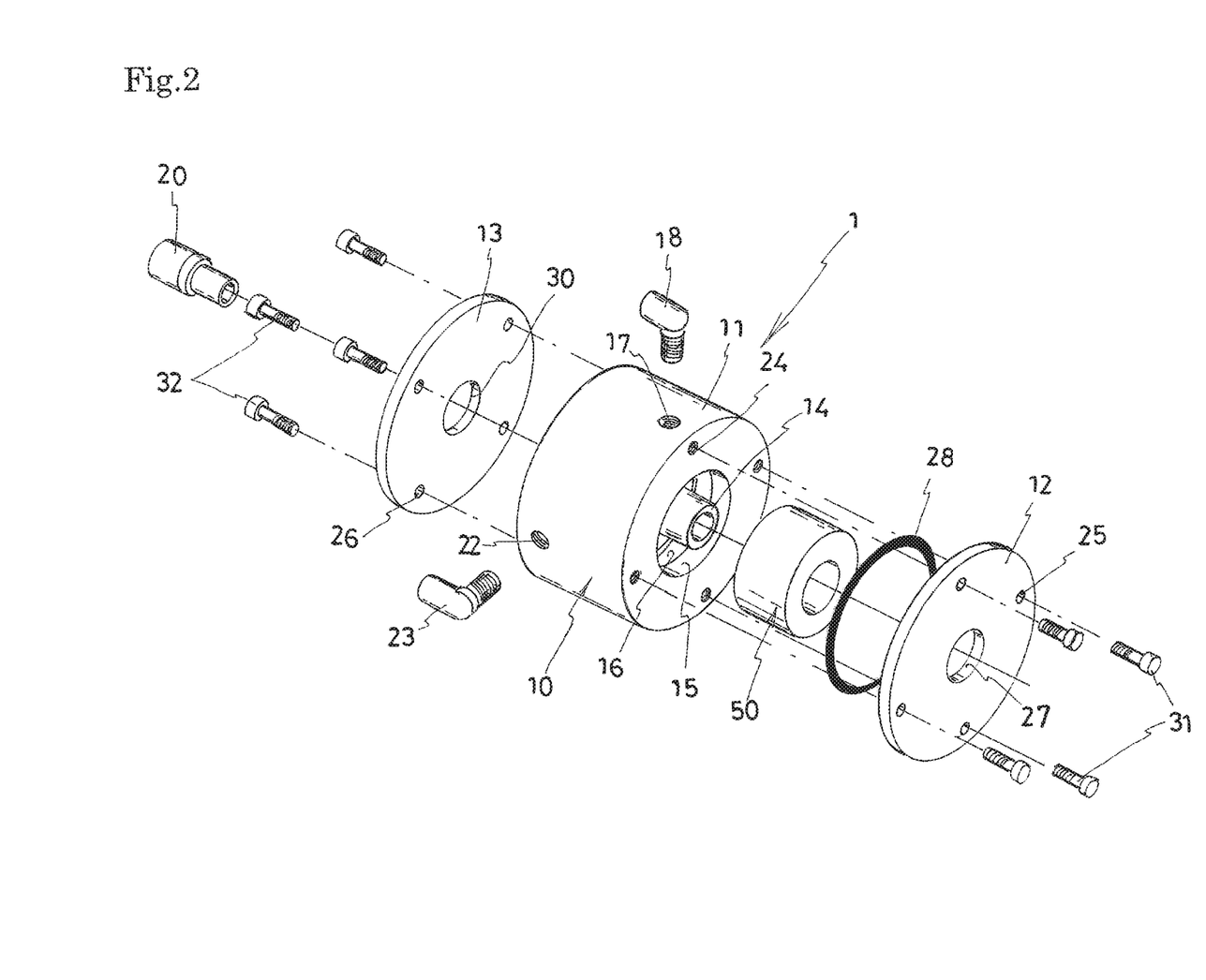
FIG. 2 is an exploded perspective view of the chuck device shown in FIG. 1.
Figure 3:
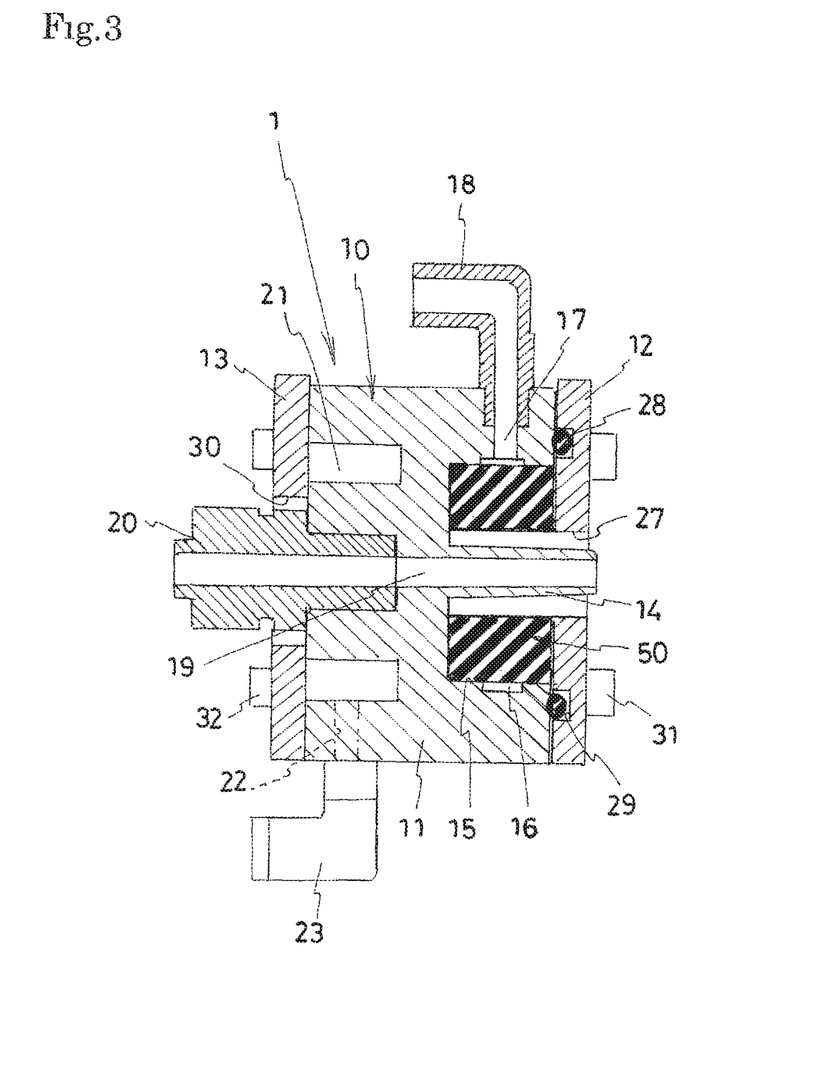
FIG. 3 is a longitudinal cross-sectional view of the chuck device shown in FIG. 1.
Figure 4:
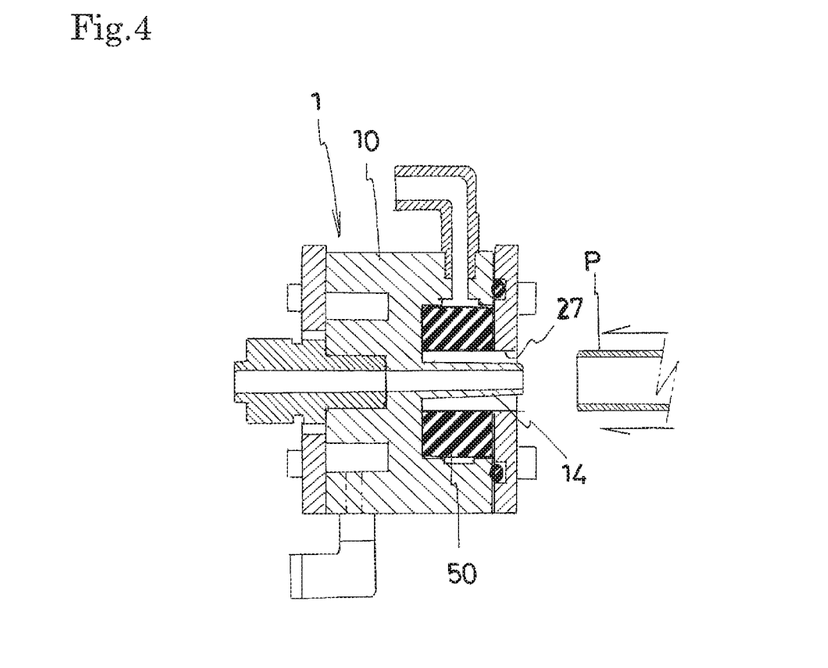
FIG. 4 is a cross-sectional view illustrating a step of use of the chuck device shown in FIG. 1, wherein a tubular clamping target component is being attached to the chuck device.
Figure 5:
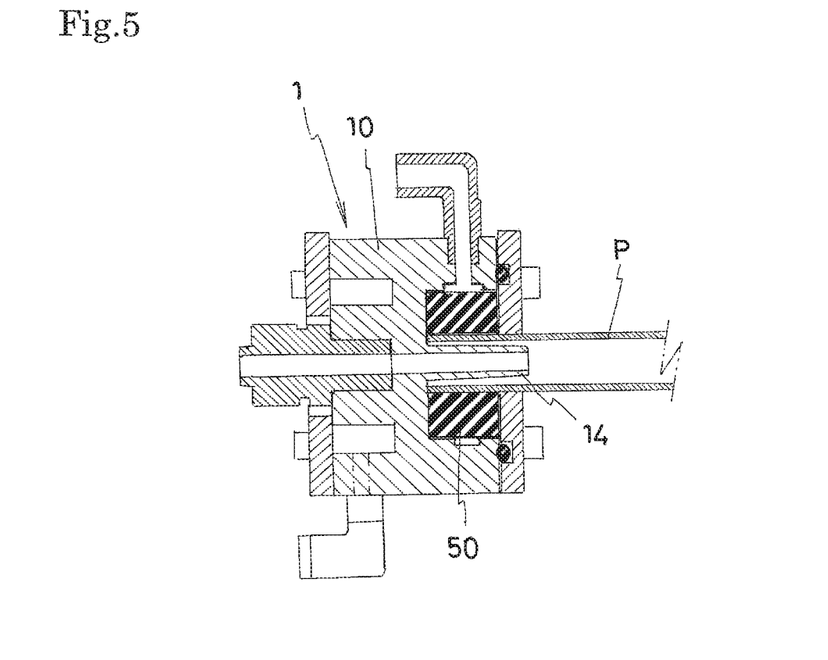
FIG. 5 is a cross-sectional view illustrating a step of use of the chuck device shown in FIG. 1, wherein the tubular clamping target component has been attached to the chuck device.

First, the tubular clamping target component P is moved by a robot hand or the like (not shown) as shown in FIG. 4 and inserted into the component insertion hole 27 formed in the chuck device 1, to attach the tubular clamping target component P to the metal core part 14 of the chuck device 1 as shown in FIG. 5. Since the chuck device 1 according to the present invention uses the rubber elastic body 50 as the elastic member, the large deformation of the rubber allows a sufficient clearance to be provided between the rubber and the metal core part 14 for the clamping target component P to be inserted therein. Moreover, the metal core part 14 also serves as a support for the clamping target component P when it is attached, so that attachment of the tubular clamping target component P to the metal core part 14 is made easier.

Figure 6:
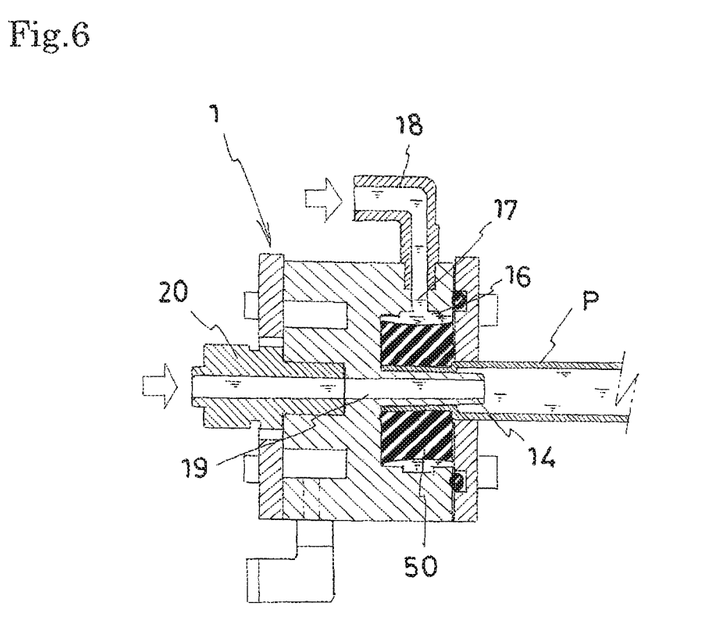
FIG. 6 is a cross-sectional view illustrating a step of use of the chuck device shown in FIG. 1, wherein the tubular clamping target component is being clamped by the chuck device.
Figure 8:
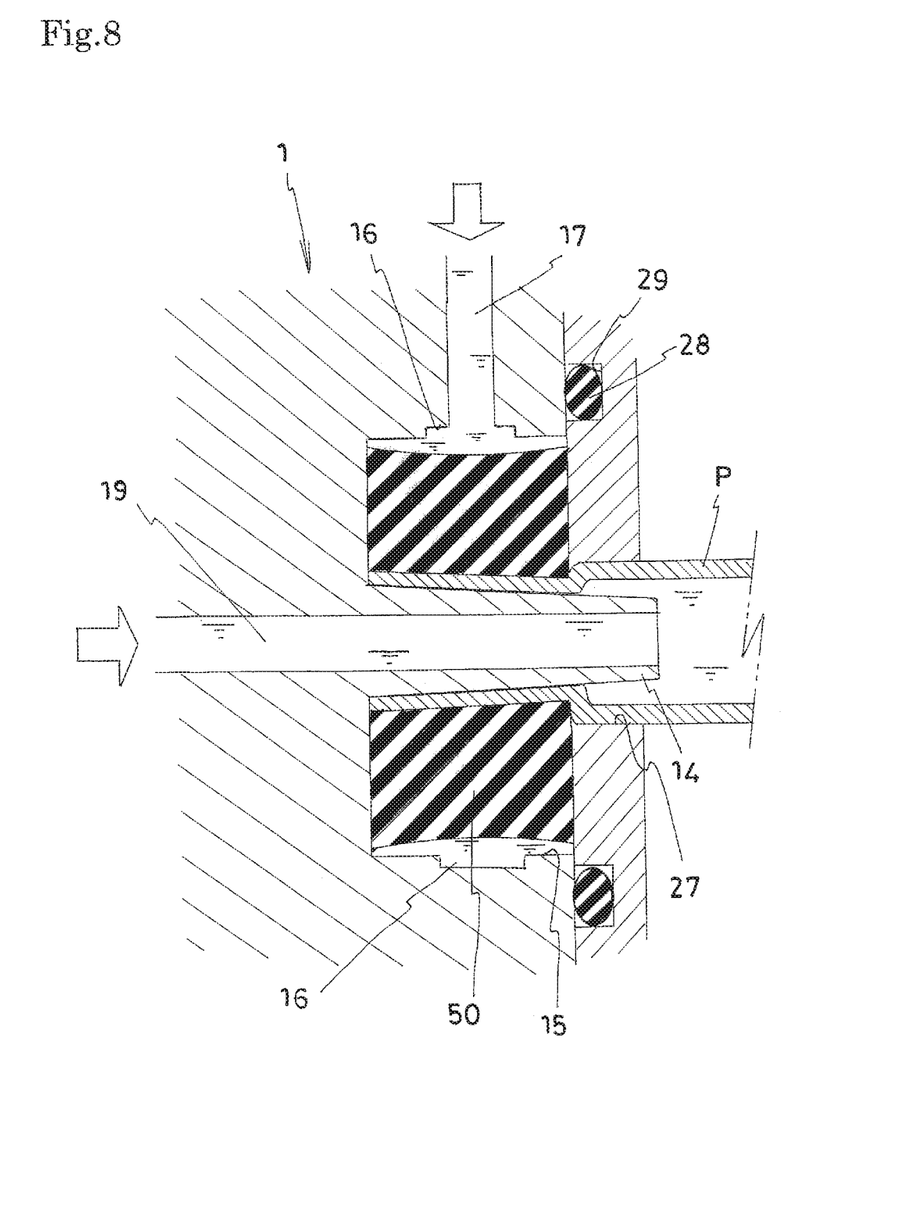
FIG. 8 is an enlarged cross-sectional view of essential parts of FIG. 6.

Next, as shown in FIG. 6, a pressurized fluid (e.g., air pressurized to 0.1 to 0.5 MPa) is introduced into the groove 16 that forms the pressure chamber through the joint 18 and the passage 17 to cause the rubber elastic body 50 to deform and expand toward the metal core part 14 by the pressure of the fluid introduced into the pressure chamber, so that the tubular clamping target component P attached to the metal core part 14 is clamped and held between the metal core part 14 and the rubber elastic body 50 that has deformed to expand. Since the metal core part 14 tapers so as to become gradually narrower toward the tip as shown in FIG. 8 to a larger scale, the expanded rubber elastic body 50 conforms to the metal core part 14 and deforms into a wedge-like shape as it clamps the tubular clamping target component P so that more powerful and reliable clamping can be achieved.

In the chuck device 1 described above, a high-temperature fluid (e.g., heated steam at a temperature of 110° C. to 170° C. and a pressure of 0.1 to 0.6 MPa) can be introduced into the tubular clamping target component P attached to the metal core part 14 via the joint 20, the passage 19, and the tubular metal core part 14. This causes thermal expansion of the rubber elastic body 50 so that the clamping force is increased, and also, as the tubular clamping target component P can be heated, the tubular clamping target component P can be subjected to predetermined processing such as bending or the like.

Figure 7:
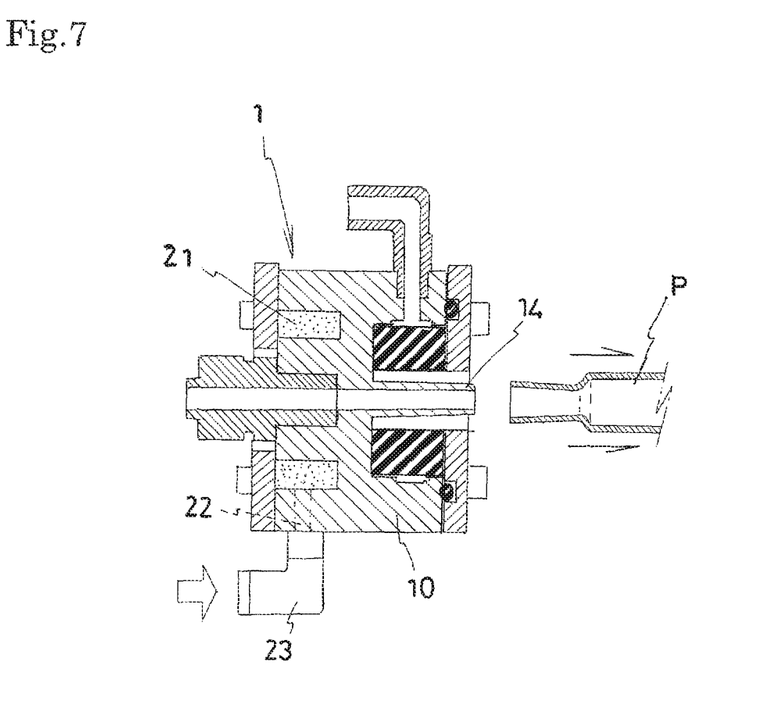
FIG. 7 is a cross-sectional view illustrating a step of use of the chuck device shown in FIG. 1, wherein the tubular clamping target component is pulled out of the chuck device.

When predetermined processing or the like to the clamping target component P has been finished, the component is released from the grip by the chuck device 1 according to the present invention. To release the clamping target component P from the hold, the supply of the pressurized fluid into the pressure chamber through the joint 18 is stopped to allow the rubber elastic body 50 that has expanded and deformed to return to its original state by its elasticity, and the supply of a high-temperature fluid, if any, into the clamping target component P through the metal core part 14 is stopped. This releases the clamping target component P from the grip, so that the component P can be pulled out from the chuck device 1 by a robot hand or the like (not shown) as shown in FIG. 7. If the coolant passage 21 is provided to the main body 10 as in the chuck device 1 of this embodiment, a coolant (e.g., room temperature air) may be introduced into the coolant passage 21 via the joint 23 to rapidly cool down the main body 10 to stop the thermal expansion of the rubber elastic body 50, in which case the clamping target component P can be drawn out more easily.

While one embodiment of the chuck device according to the present invention has been described, it goes without saying that the technical scope of the present invention is not limited to the embodiment described above. It will be obvious to a person skilled in the art that various modifications and improvements can be made to the embodiment described above, and as will be clear from the wordings of the claims, the forms with these modifications and improvements can also be included in the technical scope of the present invention.

INDUSTRIAL APPLICABILITY

The chuck device according to the present invention described above allows easy attachment of a tubular clamping target component and provides powerful and highly reliable clamping, so that it can be suitably used as a chuck device that clamps an end part of a steel or synthetic resin pipe when bending or otherwise processing the pipe to be used in various types of tubing such as in automotive tubing.

REFERENCE SIGNS LIST

1 Chuck device
10 Main body
11 Body part
12, 13 Lid part
14 Metal core part
15 Annular space
16 Groove (pressure chamber)
17, 19, 22 Passage
18, 20, 23 Joint
21 Annular coolant passage
24 Internally threaded hole
25, 26 Screw passage hole
27 Clamping target component insertion hole
28 O-ring
29 Annular groove
30 Through hole
31, 32 Screw
50 Rubber elastic body
P Tubular clamping target component

The invention claimed is:

1. A chuck device comprising:
a main body including a metal core part tapered so as to become gradually narrower from a proximal side toward a distal side and an annular space coaxial with and formed around the metal core part;
a rubber elastic body fitted in the annular space of the main body such that there is a pressure chamber between a circumferential wall that defines the annular space and the rubber elastic body, and that there is a clearance for allowing a tubular clamping target component to be inserted between the rubber elastic body and the metal core part; and
a passage for introducing a fluid to the pressure chamber, wherein
the rubber elastic body is configured to deform a tubular clamping target component attached between the tapered metal core part and the rubber elastic body when the pressurized fluid introduced into the pressure chamber via the passage presses the rubber elastic body inwardly to deform the tubular clamping target until the tubular clamping target deforms into a shape conforming to the metal core part so that the tubular clamping target is clamped.

2. The chuck device according to claim 1, wherein the metal core part is formed in a tubular shape and a high-temperature fluid is introduced into the tubular clamping target component that is attached to the metal core part via the tubular metal core part.

3. The chuck device according to claim 1, wherein the main body is formed with a coolant passage so that the main body is cooled by supplying a coolant into the coolant passage.

4. The chuck device according to claim 1, wherein the rubber elastic body is made of at least one of silicone rubber, ethylene rubber, butyl rubber, and chloroprene rubber.

* * * * *